United States Patent [19]

Coumont

[11] Patent Number: 4,626,134
[45] Date of Patent: Dec. 2, 1986

[54] APPARATUS AND METHOD FOR EXTRACTING HORIZONTAL UNDERGROUND PIPE

[76] Inventor: Martin Coumont, 314 Sutton Avenue, Winnipeg, Manitoba, Canada, R2G 0T2

[21] Appl. No.: 769,391

[22] Filed: Aug. 26, 1985

[30] Foreign Application Priority Data

Aug. 29, 1984 [CA] Canada ................................. 462053

[51] Int. Cl.$^4$ ............................................. E02F 5/10
[52] U.S. Cl. .................................. 405/184; 405/154; 175/53; 175/375; 254/79 R; 166/55.1
[58] Field of Search ................... 405/184, 154; 175/53, 175/61, 62, 258, 325; 254/29 R; 166/55.1

[56] References Cited

U.S. PATENT DOCUMENTS

| | | | |
|---|---|---|---|
| 2,535,342 | 12/1950 | Ahlgren | 166/55.1 |
| 2,598,930 | 6/1952 | Murphy | 166/55.1 |
| 2,879,101 | 3/1959 | Daroci | 254/29 R |
| 3,227,214 | 1/1966 | Whann | 166/55.1 |
| 3,504,743 | 4/1970 | Winters | 166/55.1 |
| 3,870,098 | 3/1975 | Houston | 166/55.1 |
| 3,998,428 | 12/1976 | Miles | 254/79 R |
| 4,000,879 | 1/1977 | Martin et al. | 254/29 R |
| 4,274,758 | 6/1981 | Schosek | 405/184 |
| 4,306,626 | 12/1981 | Duke et al. | 175/53 |
| 4,422,800 | 12/1983 | Parish | 405/184 |
| 4,434,969 | 3/1984 | Van Ruden | 254/29 R |
| 4,492,274 | 1/1985 | Schosek | 405/184 |
| 4,507,019 | 3/1985 | Thompson | 405/184 |

Primary Examiner—Cornelius J. Husar
Assistant Examiner—Douglas W. Hanson
Attorney, Agent, or Firm—Adrian D. Battison

[57] ABSTRACT

An apparatus and method for withdrawing existing outdated water pipe provides a frame assembly for mounting in a first shaft excavated at the water pipe. The frame includes a ram for inserting and withdrawing rod sections from the water pipe. A head assembly for mounting on the rods includes leaf spring centering devices and a plurality of single tooth dogs spring biased outwardly. When inserted into the existing pipe, the dogs spring outwardly so that the teeth engage a radially end face at the far end of a pipe section so the pipe section and head can be withdrawn. A severing device for clamping and fracturing a portion of the pipe withdrawn into the shaft is positioned adjacent a front face of the frame.

8 Claims, 9 Drawing Figures

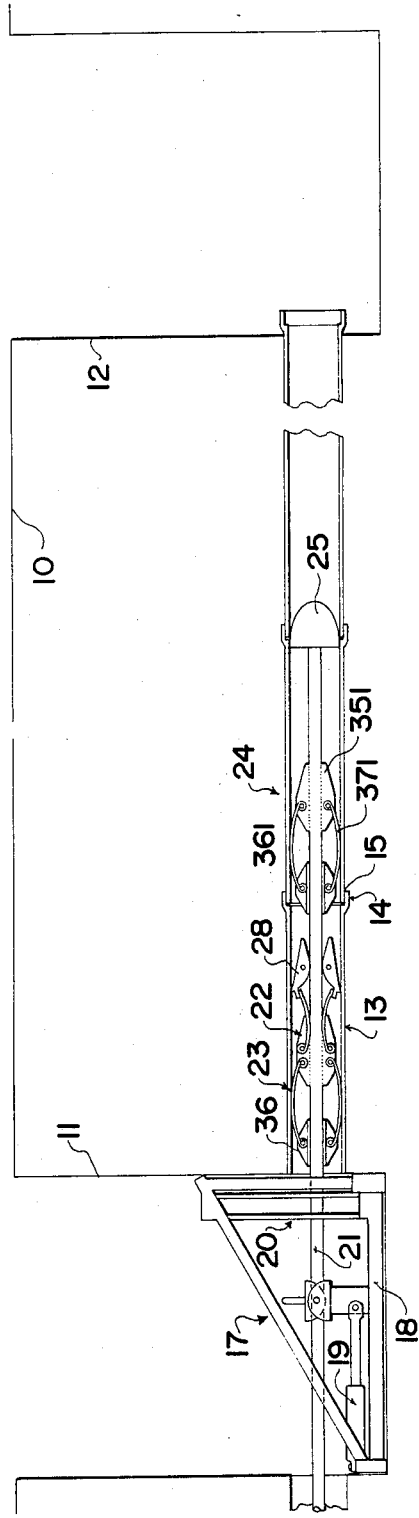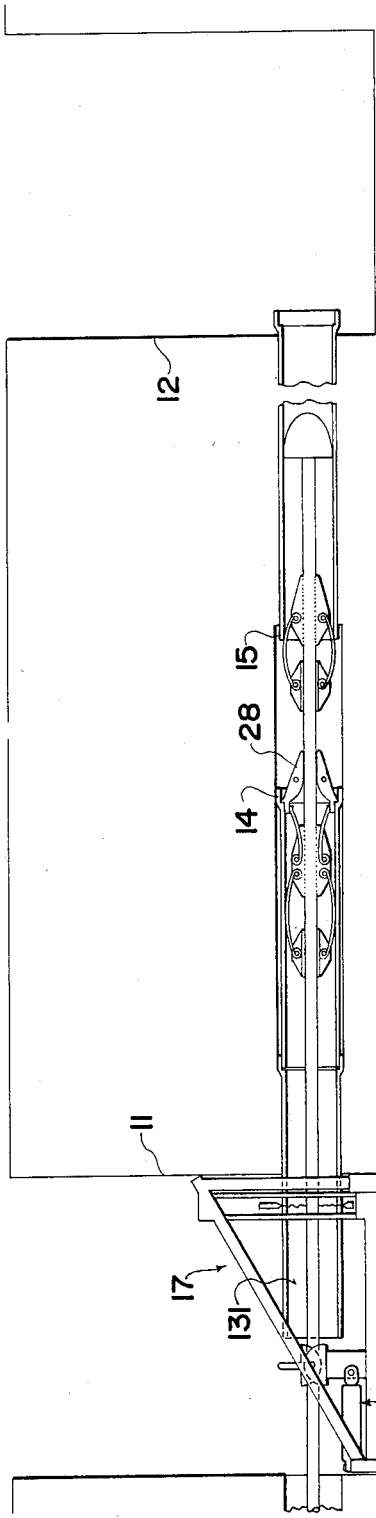

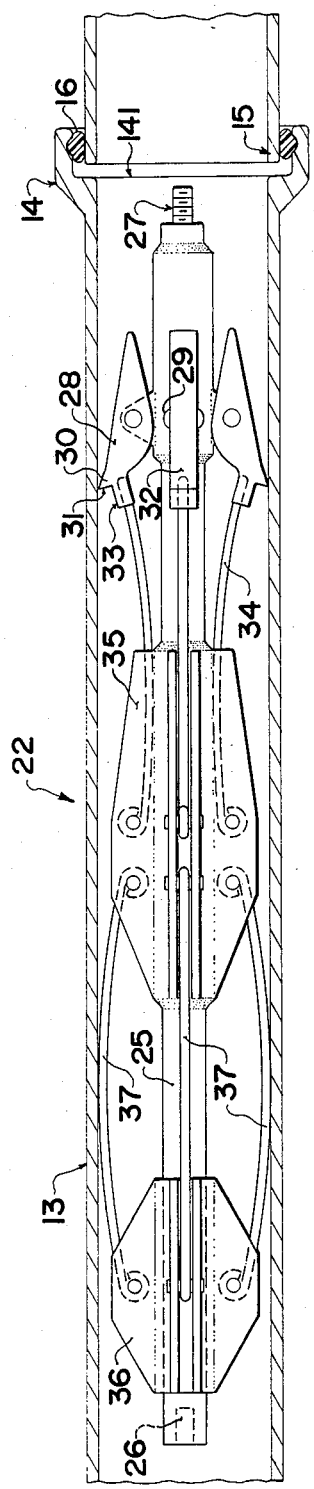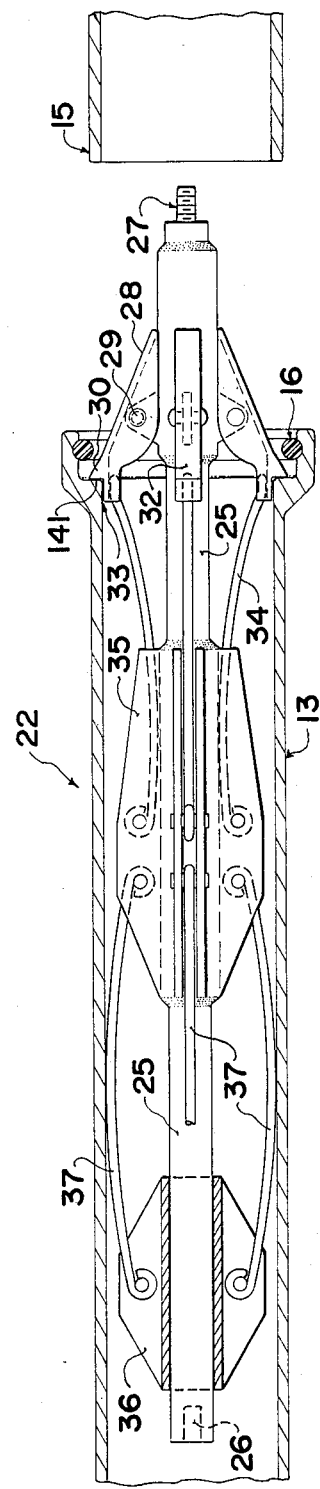
FIG. 3
FIG. 3A

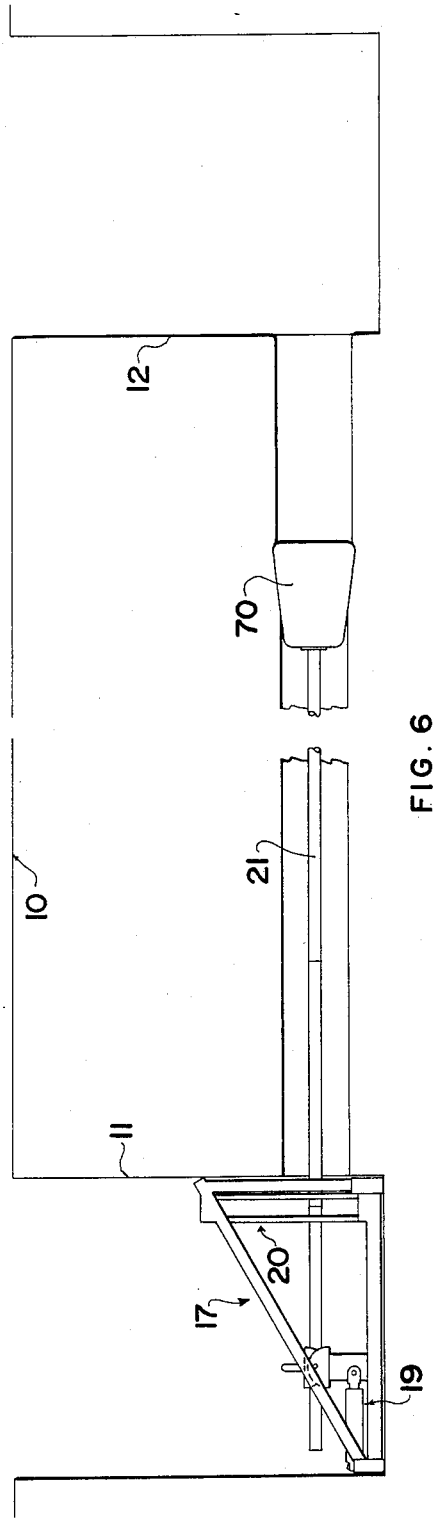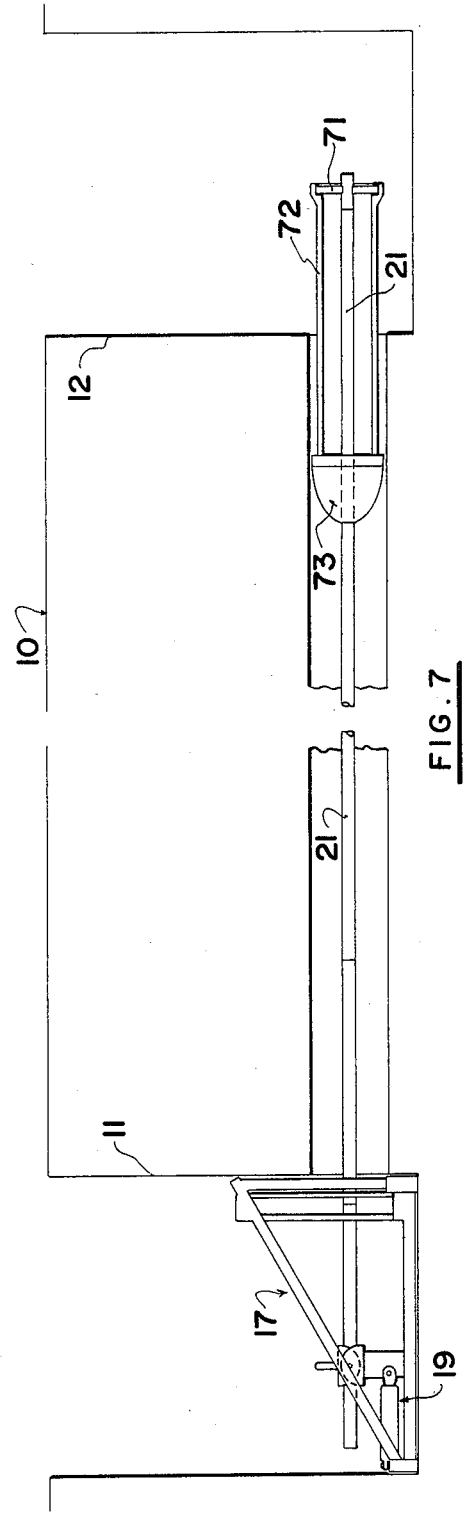

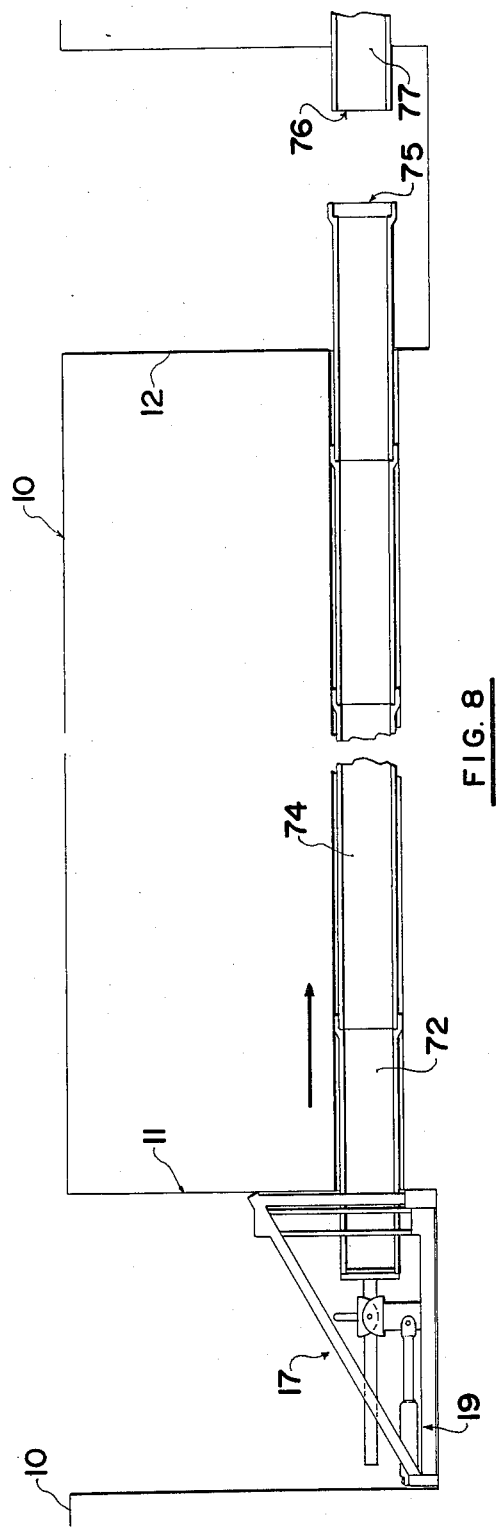

APPARATUS AND METHOD FOR EXTRACTING HORIZONTAL UNDERGROUND PIPE

BACKGROUND OF THE INVENTION

This invention relates to a method and apparatus for extracting horizontal underground pipe which is particularly but not exclusively designed for use in the removal of existing underground water pipes in a manner in which leaves a usable hole in which new water pipes can be installed.

In many cities and areas, underground water pipes have been in place for many years and have now reached the stage where serious corrosion is taking place causing many breaks and slow water losses. When such water pipes reach the end of a normal working life, therefore, it is necessary to remove the pipes and generally to replace them with new pipe which can transport the water to the existing outlets.

There are two commonly used methods for removing such water pipes. In a first method a channel is excavated directly down to the pipe along the full length of the existing pipe so that the pipe can simple be lifted from the channel and a replacement pipe laid along the channel in place of the first. This method is extremely time consuming and therefor costly, and also has a severe disadvantage particularly in areas where the water pipes need to be buried at a deep level wherein cave-ins of the excavated channel can be very dangerous for the operatives. Furthermore, the existence of various obstacles such as driveways, trees and roads in the path of the pipe can cause great inconvenience and substantially increase the cost of the excavation.

In a second commonly used method, particularly where obstacles are present, a shaft or hole is dug at either end of the obstructed area and a cable passed through the existing pipe. A backhoe is then used to pull out the existing pipe into the excavated shaft, whereupon the pipe is broken into pieces using sledgehammers. This method is normally only used in situations where there are obstructions in the path of the normal excavated channel and is therefor only used to remove short lengths of pipe, for example 10 to 25 feet in length. In view of the crude techniques employed, this method of removing and breaking existing water pipe is more time consuming and costly than the complete excavation method and is therefor only used where obstacles make the excavation method impractical.

SUMMARY OF THE INVENTION

It is one object of the present invention, therefor, to provide an apparatus and method which allow existing pipes, for example water pipes, to be removed and broken so that new water pipe can be installed in the existing hole.

According to a first aspect of the invention, there is provided an apparatus for extracting underground pipe in pipe sections comprising a frame for positioning in a hole in the ground adjacent to one end of the pipe, ram means mounted on the frame for providing substantially horizontal reciprocating movement for feeding a rod into and withdrawing the rod from the end of the pipe, a head member for attachment to the rod for insertion thereby into the end of the pipe including means for engaging a pipe section arranged whereby the head member can be fed into the pipe and at a position within the pipe can engage a pipe section so that withdrawal of the head causes withdrawal of the pipe section to a position where a portion thereon extends into said hole and clamping jaw means mounted on the frame at a position spaced from said ram means so as to engage and fracture the portion of the withdrawn pipe section at a position along its's length.

According to a second aspect of the invention there is provided an apparatus for extracting underground pipe of the type comprising a plurality of sections, each having a radial end surface for abutting an adjacent end surface of an adjacent section comprising a head member for insertion into the pipe, said head member including a body, means for attaching the body to a rod by which the member is inserted into the pipe, a plurality of toothed pipe engagement members each tooth having an apex and said engagement members being arranged in spaced relation around the body such that the teeth thereof extend radially outwardly from the body with the apexes thereof lying in a single radial plane for engaging a radial end surface of an end of a pipe section, means mounting said engagement members on said body for substantially radial movement of said teeth, and spring biasing means for biasing said engagement members outwardly for contact of said teeth with an inner surface of the pipe whereby the head member can be inserted into and along the pipe with the teeth in engagement with the inner surface until the teeth move outwardly under said spring bias into contact with said radial surface for withdrawal of said pipe section with said head member.

According to a third aspect of the invention, there is provided a method of extracting substantially horizontal underground pipe in pipe sections comprising digging a hole adjacent to one end of the pipe and repeating the steps of inserting a rod horizontally into the pipe, engaging a pipe section such that withdrawal of the rod causes withdrawal of the pipe section, clamping the pipe section so as to fracture it at a position adjacent the edge of the hole through which the pipe emerges to produce a fractured portion within the hole and withdrawing the fractured portion from the hole.

It is one advantage of the present invention therefor, that an existing pipe can be removed in relatively long lengths, for example, fifty to one hundred fifty feet from a first excavation to a second excavation thereby providing a time saving which can be as much as twenty five to thirty five per cent.

A new pipe can then be inserted into the existing bore or shaft using the same ram assembly for drawings the new pipe through the bore.

The new apparatus and method, therefor, also can avoid the danger of potential collapse or cave-ins of an excavation therefor substantially decreasing the risk involved in the work.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a schematic side elevational view of an apparatus according to the invention in an operating situation.

FIG. 2 is a view similar to that of FIG. 1 at a further stage of the operation.

FIGS. 3 and 3A are side elevational views of the clamping head of FIG. 1, the former showing insertion into the existing pipe and the latter showing withdrawal of the head with a pipe section.

FIG. 6 is a side elevational view similar to FIG. 1 on a reduced scale showing yet further stage in the method of introducing a new pipe.

FIG. 7 is view similar to FIG. 6 of a yet further stage.

FIG. 8 is a view similar to FIG. 6 of a still further stage of the method.

In the drawings like characters of reference indicate corresponding parts in the different figures.

DETAILED DESCRIPTION

Figure 4:
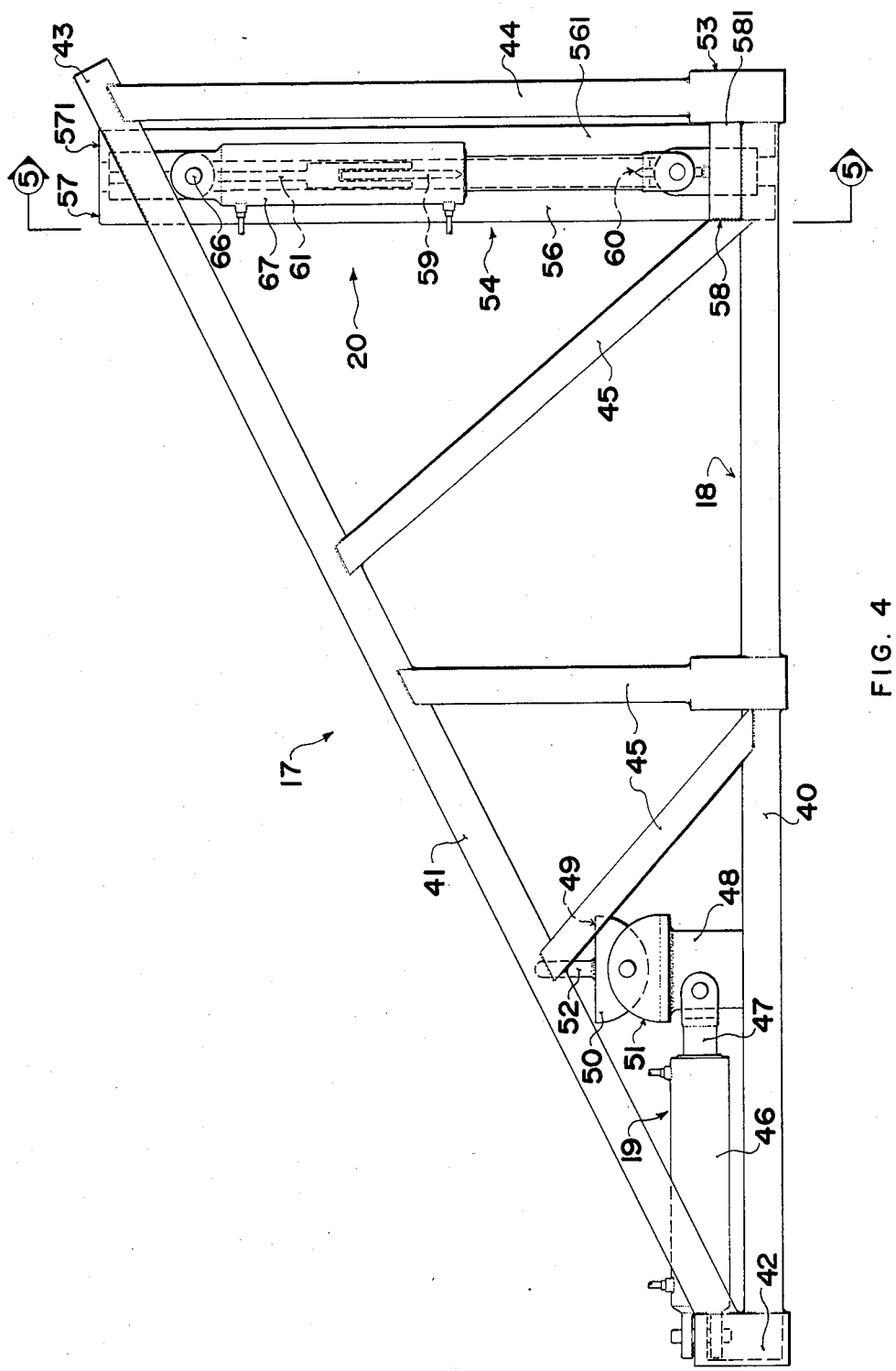
FIG. 4 is a side elevational view on an enlarged scale showing the frame, ram, and clamp jaws of FIG. 1.

Turning firstly to FIG. 1, the apparatus for withdrawing an existing pipe is shown schematically in side elevation in position in a pipe. Specifically, the ground level is indicated at 10, and a pair of excavated shafts or holes indicated at 11 and 12 respectively. The existing pipe is indicated at 13 and as shown, the pipe is formed in a plurality of sections with a female end 14 and a male end 15 which incorporate to form a seal generally using a rubber washer or ring to complete the seal.

Pipes of this general type are well known and have been in use for many years in underground situations for transporting water or other materials. The pipe sections are commonly supplied in 6 foot lengths or in 18 foot lengths and have in the past been manufactured in various materials including cast iron and ductile iron. The rubber sealing ring is indicated at 16. It should be appreciated that the exact structure of pipe shown is only one example and various different types of pipe sections have been manufactured in different locations and for different purposes.

The apparatus comprises an external or in hole portion generally indicated at 17, including a support frame 18, a ram assembly 19, and a severing device 20. In addition, the apparatus includes a set of rod portions 21, which can be assembled by screw threaded couplings into an elongated rod for passage through the pipe 13. As one of the rod sections there is provided a grasping head 22 for insertion with the rod into the pipe. The grasping head includes a trailing centering device 23 and there is provided an advanced centering device 24 which runs in the pipe forwardly of the grasping head. Finally, the device includes a nose portion 25.

Turning now to FIG. 3 there is shown in an enlarged view the grasping head 22. This comprises a central rod body 25 with a female screw threaded portion 26 at one end and a male screw threaded portion 27 at the other end.

At a forward end of the grasping head is provided a plurality of pipe engagement dogs 28 which are pivotally mounted on pins 29 on the body 25. In practice, 4 such dogs can be provided angularly spaced around the body. Each of the dogs 28 includes a tooth 30 having a rear radial face 31 and a front inclined face 32. The rear face 31 interconnects with an axial face 33 providing a step. The front face 32 generally extends in an inclined direction inwardly toward the body, past the pivot pin 29. This provides an outer surface of the dog. An undersurface adjacent or in contact with the body 25 allows the dog to pivot about the pin 29 which effectively moves the tooth 30 inwardly and outwardly radially of the body 25, to take up positions shown respectively in FIGS. 1 and 2. The outermost position of FIG. 2 is shown in FIG. 3.

The dogs 28 are spring biased outwardly by leaf springs 34 which extend along the body and are coupled to a central fixed coupling member 35 mounted on the body 25. The leaf springs are mounted on the body 35 by suitable pins and provide the outward biting force on the dogs by contact along their length with the rod body 25. Thus, the teeth 30 of the dogs 28 are forced radially outwardly to take up the position shown in FIG. 3.

It would be appreciated that the teeth 30 of the dogs lie in a single radial plane surrounding the body 25 and only a single tooth is provided on each of the dogs whereby the surfaces 31 of the dogs effectively provide an anular grasping surface for engaging a radial face on the pipe section.

Interconnecting the body 35 with a slidable body 36 is provided a plurality of outwardly curved leaf springs 37 again surrounding the rod body 25 in angularly spaced arrangement. The leaf springs 37 are curved so as to provide a central portion which is biased outwardly relative to the body 25 but which can be depressed inwardly by engagement with the inner wall of a pipe whereupon the slide member 36 can move axially of the body 25 to accommodate the depression of the springs 37.

The positions shown in FIG. 3 is a relaxed position of the springs 36 and 34. However, it would be appreciated that when inserted into a pipe as shown in FIG. 1, the inner surface of the pipe engages the surfaces 32 of the dogs to depress them inwardly and also engages the center section of the springs 37 to depress them inwardly also. The springs 37 therefore act to center the rod body 25 in the pipe and to control its movement along the pipe.

As shown in FIG. 1, a second centralizing section 24 is provided incorporating a fixed body 351, springs 371 and slide body 361 which together operate in the same manner as described in relation to the similar portions of the grasping head 22.

Thus in use the graping head can be moved along the pipe by forwarding motion of the rod with the teeth 30 and the dogs 28 running along the inner surface of the pipe until the teeth encounter a radially outwardly extending channel in the pipe, as defined by an end surface of the pipe. In the example shown, the radially outwardly extending surface indicated at 141 of the pipe is provided at the female end. However in other arrangements of pipe, the male end can be used to provide the radial surface depending upon the angles and convenience of the pipes concerned.

Figure 5:
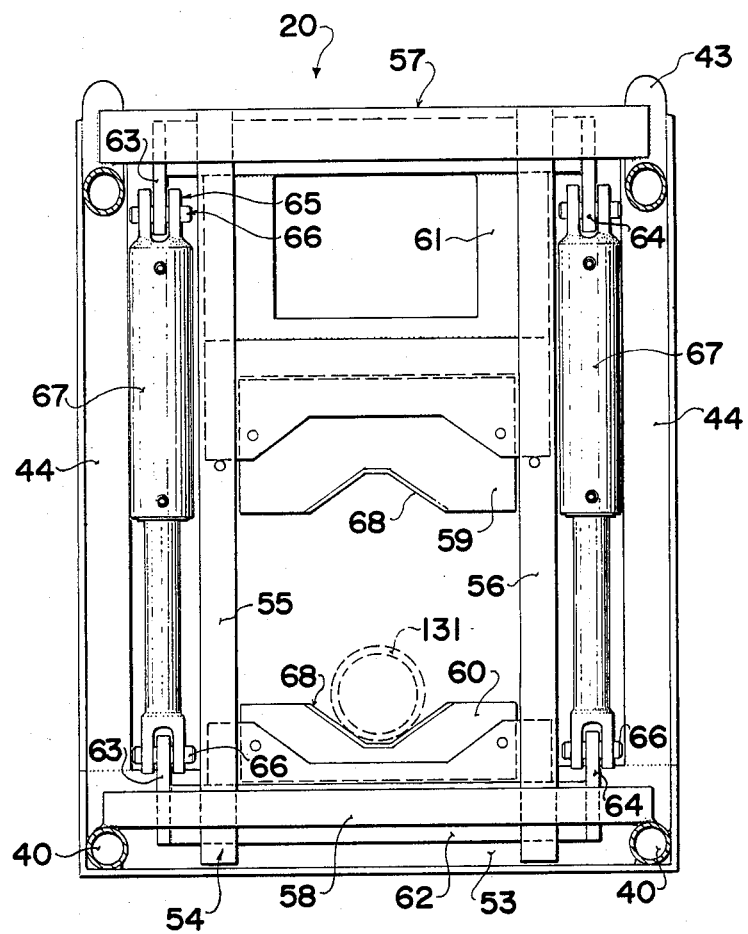
FIG. 5 is a view along the lines 5—5 of FIG. 4.

Turning now to FIGS. 4 and 5 those shown in more detail and on a larger scale the section of the apparatus in the shaft 11 comprising the frame 18, ram assembly 19 and shearing or clamping device 20.

Specifically the frame 18 comprises a substantially triangular frame in side elevational view comprising a pair of base struts 40 arranged in parallel relationship longitudinally of the frame. A pair of parallel upper struts 41 extend from an apex at the rear of the frame indicated at 42 to an upper top edge of the frame indicated at 43. Parallel downwardly extending struts 44 complete the triangular frame and provide a front face which is rectangular as shown in FIG. 5 for engaging an end wall or side wall of the shaft 11. Reinforcing braces 45 of suitable shape are provided to give sufficient rigidity to the frame. The ram assembly 19 comprises a hydraulic ram 46 having a piston rod 47 which is coupled to a slide member 48 which runs over the frame to provide reciprocating movement in a horizontal direction. On top of the slide member 48 is provided a clamp 49 provided by a pair of eliptical relatively pivoted clamping members 50 and 51 with a lever 52 mounted on the upper member 50. The clamping members 50 and 51 are arranged and shaped so that if the lever 52 is inclined forwardly then a portion of the rod inserted between the clamping members can be pushed forwardly by the ram 46 with rearward movement of the ram 46 merely acting to slide over the rod. Similarly, rearward movement of the lever 52 acts to cause the ram 46 to withdraw the rod rather than feed it forwardly.

Sections of rod 21 can be coupled together so that the complete elongate rod can be fed forwardly through the pipe by the ram assembly 19 to carry the grasping assembly 22 into the required position.

Immediately rearward of the front rectangular frame portion of the frame 18 defined by the vertical struts 44 and the transverse bottom strut 53 is provided the shearing device generally indicated at 20. The shearing device comprises a slide frame 54 defined by two pairs of uprights 55, 56 and two pairs of transverse struts 57 and 58 arranged at the top and bottom respectively of the uprights 55, 56. The uprights 55, 56 are spaced inwardly from the sides of the main frame 18 as indicated in FIG. 5. As shown in FIG. 4, each pair of uprights comprises a forward upright 561 and a rearward upright 56 which are spaced by a distance sufficient to receive in sliding arrangement the shearing assembly including upper and lower shear blades 59, 60. The transverse pair of struts 57 includes a front strut 571 and a rear strut 57 and similary the lower transverse strut includes a front strut 581 and a rear strut 58 thus completing the spaced slide arrangement defined by the upright pairs 55, 56.

Within the slide frame the shearing assembly is mounted for free vertical sliding movement. The shearing assembly comprises an upper shear blade frame 61 and a lower shear blade frame 62. The upper frame 61 defines a channel for receiving the single blade 59 and similarly the lower frame defines an opposed channel for receiving the lower blade 60. Furthermore both the frames 61 and 62 provide a pair of spaced lugs 63, 64 for receiving an attachment fork 65 and pivot pin 66 of a hydraulic ram 67.

As the shear assembly including the frames 61 and 62 is free to move up and down within the slide frame, the position of the blades 59 and 60 can be varied by the sliding movement. With the hydraulic rams 67 extended, the blades 59 and 60 are moved apart to give ample room for the passage therebetween of the rods 21 and also the pipe 13. Thus, more specifically, extension of the rams 67 forces the upper frame 61 upwardly and the lower frame 62 downwardly to open the space between the blades to accommodate the rods and pipe.

The blades 59 and 60 define V-shaped severing surfaces which when drawn together by retraction of the rams 67 provides four-point contact on the circular pipe which acts to fracture the pipe in the plane defined by the blades. The V-shaped surfaces are indicated at 68.

Turning now to FIGS. 1, 2, 6, 7 and 8 the operation of the apparatus will now be described.

In a first step the shafts 11 and 12 are excavated to expose ends of a pipe length formed from a plurality of inter-connected pipe sections. The spacing between the shafts 11 and 12 can vary in dependence upon the circumstances but can be as much as 200 feet and certainly can be greater than 50 feet thus substantially reducing the amount of excavation necessary and allowing the shafts 11 and 12 to be positioned at most conveient locations on an existing pipe.

The frame 18 is then lowered into one of the shafts 11 and located in position conveniently with the front face thereof defined by the struts 44 and 53 resting against the side of the shaft 11 through which the pipe 13 emerges. The depth of the shaft is arranged such that with the frame in position at the bottom of the shaft the pipe emerges substantially centrally of the frame so that it can pass through between the blades 59 and 60.

The head assembly 22 including the centralizing devices 23 and 24 and the pointed head 25 are then fed into the exposed end of the pipe 13 either as a single piece or in sections and then fitted together by means of the screw thread couplings. One or more rod sections 21 are then attached to the exposed end of the centering device 23 and engaged by the clamp 49 of the ram 19.

Actuation of the ram 19 therefore acts to forward the grasping head 22 along the pipe with additional rods 21 being added as the rods and grasping head are fed forwardly. This position is illustrated in FIG. 1 and it will be seen that the grasping head slides inwardly of the pipe 13 controlled in its movement by the centering devices 23, 24 and with the dogs held inwardly by the inner surface of the pipe.

When the dogs reach a junction between two pipe sections the dogs enter the space between the pipe sections so that the teeth grasp an end radial surface of the closest pipe section. This movement can be detected at the feed end even at a considerable distance along the pipe by the feel of the rods 21 and by the sound of the movement occurring. At this time the clamp 49 is reversed so that actuation of the ram 19 withdraws the rods 21 and the grasping head 22 together with the first section of pipe as illustrated in FIG. 2.

When the pipe section has reached the position illustrated in FIG. 2 with the closest end thereof withdrawn into the shaft 11 so that a portion projects through the blades, the ram 19 is halted and the rams 67 actuated to draw the blades 59, 60 together. In view of the floating action of the frames 61 and 62, the retraction of the ram 67 acts to position the blade 59 directly on top of the pipe and the blade 60 beneath the pipe regardless of the actual position and the diameter of the pipe. The completion of the stroke of the ram 67 acts, as previously explained, to fracture the pipe in the plane of the blades thus releasing the portion which is exposed within the shaft 11. This portion can then be removed by removing one or more portions of rod 21 and then withdrawing the pipe portion indicated at 131 upwardly from the hole or shaft 11.

The rods 21 are then replaced so that further actuation of the ram 19 withdraws the pipe section by further length sufficient to position a further portion within the shaft 11 for severing and withdrawal as previously explained. One particular example of pipe is formed in 18-foot lengths and using a frame 18 of approximately 10 feet in length, the pipe can be removed by fracturing into 3 portions each of roughly 6 feet in length.

After complete withdrawal of the first pipe section and the head 22, the head 22 can be reinserted into the opening or bore from which the first pipe section hirst pipe section and the head 22, the head 22 can be reinserted into the opening or bore from which the first pipe section has been removed and under control of the centering devices and the pointed head 25 it can move through the bore under forwarding action by the rods and ram to enter the second pipe section which of course is still in the bore some distance from the shaft 11. The head then enters the second pipe section and as previously explained slides along the pipe section until it engages the junction between the second pipe secction and the third pipe section.

The pipe sections can thus be removed in turn until the complete pipe is removed leaving an open bore between the shafts 11 and 12.

At this stage using the ram 19 the rod without the head is re-fed through the open bore to reach the shaft 12. A plug 70 is then attached to the rod at the shaft 12 as illustrated in FIG. 6 and the rod 21 withdrawn through the bore to draw the plug through the bore. The plus is chosen to be of a diameter slightly greater than the bore so that it acts to compress and clear the bore ready for receipt of the new pipe.

As illustrated in FIG. 7 the new pipe is fed into place from the shaft 12 using the rod 21. Thus the rod is again fed through the bore from the shaft 11 to the shaft 12 and at the shaft 12 a new pipe section is threaded over the rod and a transverse bar 71 is connected to the rod 21 at the far end of the new pipe section so withdrawal of the rod draws the new pipe section 72 through the bore. In order to prevent material entering the pipe and being drawn out of the wall of the bore, a plug 73 is positioned in the new pipe section at the front with the rod 21 passing centrally through the plug. Thus the new pipe is drawn through the bore up to the shaft 11 following which the rod is again fed back to the shaft 12 to receive a further section of new pipe.

When the new pipe is complete by drawing of the final section into the bore, the new pipe indicated at 74 can then be pushed gently backwardly by the ram 19 until the end indicated at 75 engages the end 76 of a further section of new pipe which has previously been inserted from the shaft 12 to a further shaft (not shown). Thus the gentle movement of the whole of the new pipe 74 backwardly up to the new pipe 77 causes the end 75 and 76 to abut in the proper sealing arrangement thus completing the pipe from the shaft 11 up to the earlier shaft (not shown) following which the shaft 12 can of course be refilled and further work carried on from the shaft 11 to a yet further shaft.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for extracting underground pipe of the type comprising a plurality of sections each having a radial end face for abutting an end face of an adjacent section, the apparatus comprising a frame for positioning in a hole in the ground with one end of the frame adjacent to one end of the pipe, ram means mounted on the frame for providing substantially horizontal reciprocating movement for feeding a rod into and withdrawing the rod from the end of the pipe, a head member for attachment to the rod for insertion thereby into the end of the pipe including a body, means for attaching the body to the rod by which the member is inserted into the pipe, a plurality of rigid pipe engagement members each having an apex and arranged in spaced relation around the body such that the apexes thereof extend radially outwardly from the body with the apexes thereof lying in a single radial plane for engaging a radial end surface at an end of a pipe section, means pivotally mounting each of said engagement members on said body for substantially radial movement of said apex and spring means for biasing each of said engagement members outwardly for contact of said apex with an inner face of the pipe whereby the head member can be inserted into and along the pipe with the apexes in engagement with the inner surface until the apexes move outwardly under said spring bias into contact with said radial face for withdrawal of said pipe section with said head member, said body including first and second centering means for engaging the inner surface of the pipe forwardly and rearwardly respectively of said pipe engagement members so as to maintain said body central of said pipe while moving longitudinally of said pipe, each of said centering means comprising a plurality of leaf springs arranged in angularly spaced relation around the body, the leaf springs being biased into contact with the inner surface of the pipe, and clamping jaw means mounted on the frame at a position spaced from said ram means and adjacent said one end of the frame exteriorly of the pipe so as to engage and fracture the portion of the withdrawn pipe section at a position along its length.

2. Apparatus according to claim 1 wherein said clamp jaw means includes upper and lower jaws mounted on said frame at a position where said pipe extends between said jaws and wherein there is provided means mounting said jaws on said frame for vertical sliding movement relative to the frame to accommodate different diameters and position of pipe.

3. Apparatus according to claim 1 wherein the clamp jaw means includes upper and lower jaws each being shaped to provide point contact of the jaw on a circular pipe.

4. Apparatus according to claim 1 wherein the frame is elongate with said ram means mounted at one end thereof and the clamp jaw means mounted at the other end thereof whereby the portion extending from the clamp jaw means to the ram means can be fractured and removed.

5. Apparatus according to claim 1 wherein one end of each leaf spring is attached to the body at an axially fixed location and wherein the other end of each leaf spring is attached to the body by means providing sliding movement along the body, whereby compression of the leaf spring causes said sliding movement.

6. Apparatus according to claim 1 wherein each tooth has a rear surface which is substantially radial for engaging said radial end surface and a front surface inclined relative to said radial rear surface for running along said inner surface of the pipe when said head member moves in said insertion direction.

7. A method of extracting substantially horizontal underground pipe in pipe sections comprising digging a hole adjacent to one end of the pipe and repeating the steps of inserting a rod horizontally into the pipe, engaging each pipe section in turn at an end thereof remote from the hole such that withdrawal of the rod causes withdrawal of the pipe section, clamping the pipe section so as to fracture it at a position adjacent the edge of the hole through which the pipe emerges to produce a fractured portion within the hole and withdrawing the fractured portion from the hole.

8. A method according to claim 7 wherein after withdrawing the whole of the pipe from said hole to a second hole remote therefrom, a plug is drawn by said rod from the remote hole to said first hole, the plug having a greater diameter than the withdrawn pipe and wherein a new pipe is drawn in sections from said remote hole to said first hole through the bore defined by said plug.

* * * * *